United States Patent [19]
Eifrig et al.

[11] Patent Number: 5,974,184
[45] Date of Patent: Oct. 26, 1999

[54] INTRA-MACROBLOCK DC AND AC COEFFICIENT PREDICTION FOR INTERLACED DIGITAL VIDEO

[75] Inventors: Robert O. Eifrig; Xuemin Chen; Ajay Luthra, all of San Diego, Calif.

[73] Assignee: General Instrument Corporation, Horsham, Pa.

[21] Appl. No.: 08/957,511

[22] Filed: Oct. 24, 1997

Related U.S. Application Data

[60] Provisional application No. 60/040,120, Mar. 7, 1997, and provisional application No. 60/042,245, Mar. 31, 1997.

[51] Int. Cl.[6] .................................................. G06K 9/006
[52] U.S. Cl. .......................................... 382/236; 382/248
[58] Field of Search ..................................... 711/202, 220; 345/502, 202, 203, 418; 348/721, 402, 403, 407, 408, 409, 413, 415, 416, 699, 399; 386/68, 67; 360/70, 75; 382/232, 233, 234, 235, 236, 238, 239, 240, 243, 244, 248, 250, 251, 252, 253; 395/114, 376; 712/1

[56] References Cited

U.S. PATENT DOCUMENTS

| | | | |
|---|---|---|---|
| 5,608,888 | 3/1997 | Purcell et al. ........................... | 399/412 |
| 5,647,048 | 7/1997 | Ting et al. .................................. | 386/68 |
| 5,668,609 | 9/1997 | Dunbar et al. ........................... | 382/238 |
| 5,727,088 | 3/1998 | Kim ......................................... | 382/238 |
| 5,802,210 | 9/1998 | Kurata et al. ............................ | 382/250 |
| 5,805,762 | 9/1998 | Boyce et al. ............................. | 386/68 |
| 5,815,646 | 9/1998 | Purcell et al. ........................... | 395/163 |
| 5,822,003 | 10/1998 | Girod et al. ............................ | 382/236 |

*Primary Examiner*—Bijan Tadayon
*Attorney, Agent, or Firm*—Barry R. Lipsitz; Ralph F. Hoppin

[57] ABSTRACT

DC and AC DCT transform coefficients of an INTRA coded block are differentially encoded by selecting predictor DC and AC coefficients from a left-hand neighboring block and a top neighboring block. Each block is coded according to a frame mode, a reordered field mode, and a non-reordered field mode. The AC predictor block is selected according to the respective coding modes of the blocks, and the block in which a DC predictor resides. The top block is selected as an AC predictor when the top block and current block are both reordered field mode, or both frame mode and/or non-reordered field mode, and the DC predictor resides in the top block. Zeroed AC spatial transform coefficients are used in place of the AC spatial transform coefficients from the selected block when the selected block is not INTRA coded, or does not reside in the same Video Object Plane (VOP) as the current block. DC coefficients may be non-linearly quantized.

42 Claims, 8 Drawing Sheets

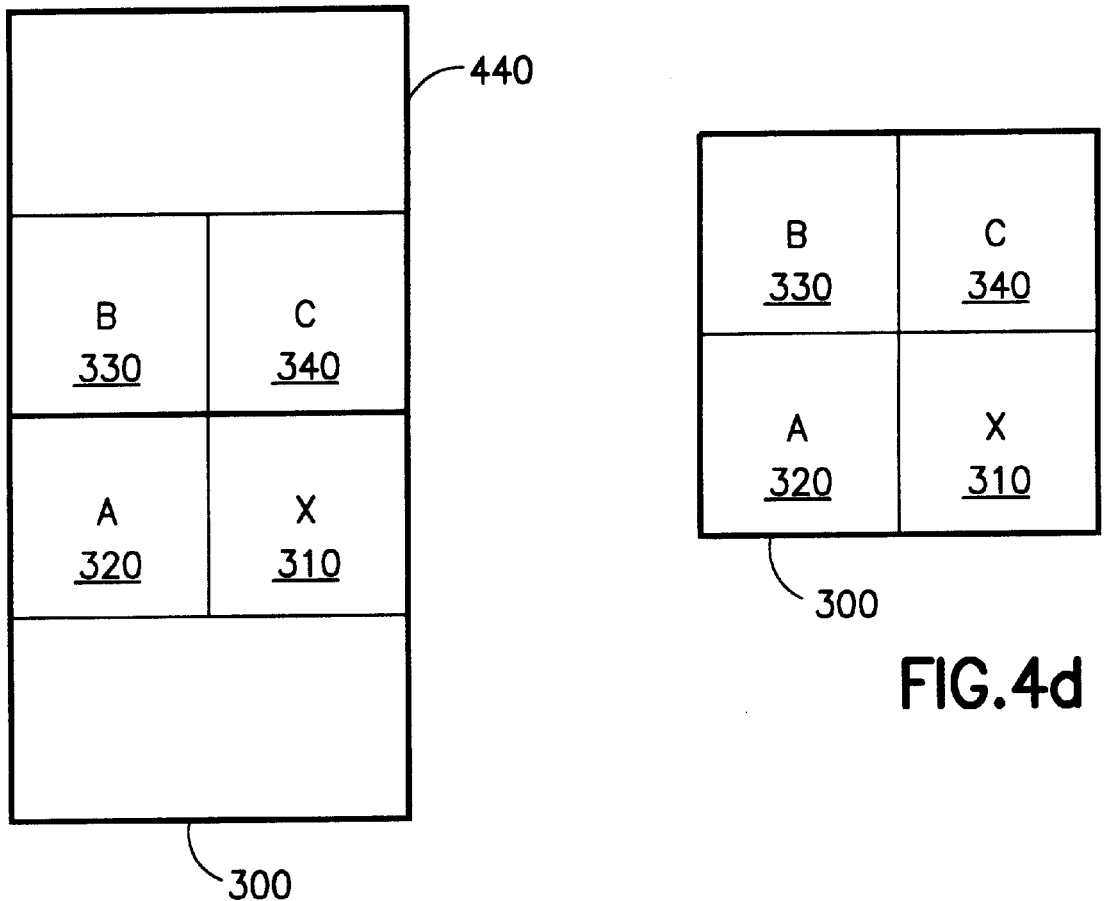
FIG.4b
FIG.4d
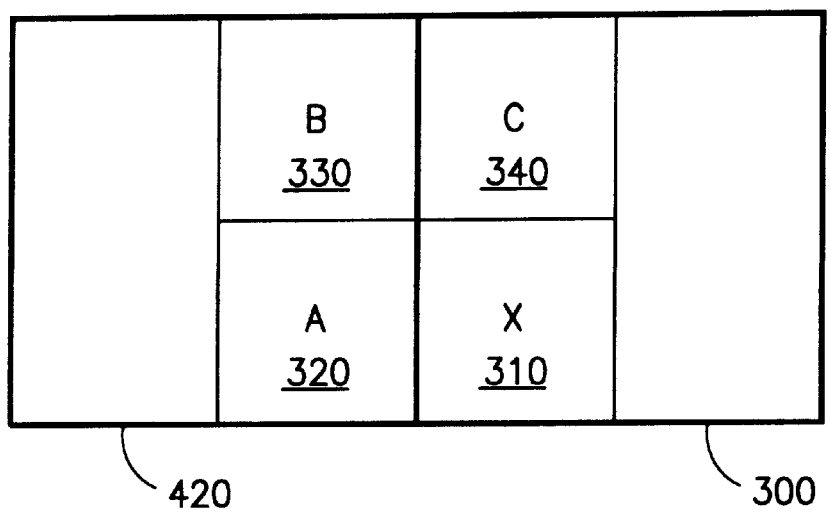
FIG.4c

INTRA-MACROBLOCK DC AND AC COEFFICIENT PREDICTION FOR INTERLACED DIGITAL VIDEO

This application claims the benefit of U.S. Provisional Application Ser. No. 60/040,120, filed Mar. 7, 1997, and U.S. Provisional Application Ser. No. 60/042,245, filed Mar. 31, 1997.

BACKGROUND OF THE INVENTION

The present invention relates to a method and apparatus for coding of DC and AC coefficients for intra-macroblock digital video, in particular, when the current macroblock and/or a neighboring macroblock is interlaced (e.g., field) coded. Predictor coefficients from neighboring macroblocks are selected for use in differentially encoding the coefficients of a current macroblock to optimize coding efficiency. The coefficients are obtained from a spatial transformation such as the Discrete Cosine Transform (DCT), for example.

The invention is particularly suitable for use with various multimedia applications, and is compatible with the MPEG-4 Verification Model (VM) 8.0 standard (MPEG-4 VM 8.0) described in document ISO/IEC/JTC1/SC29/WG11 N1796, entitled "MPEG-4 Video Verification Model Version 8.0", Stockholm, July 1997, incorporated herein by reference. The MPEG-2 standard is a precursor to the MPEG-4 standard, and is described in document ISO/IEC 13818-2, entitled "Information Technology—Generic Coding of Moving Pictures and Associated Audio, Recommendation H.262, " Mar. 25, 1994, incorporated herein by reference.

MPEG-4 is a new coding standard which provides a flexible framework and an open set of coding tools for communication, access, and manipulation of digital audio-visual data. These tools support a wide range of features. The flexible framework of MPEG-4 supports various combinations of coding tools and their corresponding functionalities for applications required by the computer, telecommunication, and entertainment (i.e., TV and film) industries, such as database browsing, information retrieval, and interactive communications.

MPEG-4 provides standardized core technologies allowing efficient storage, transmission and manipulation of video data in multimedia environments. MPEG-4 achieves efficient compression, object scalability, spatial and temporal scalability, and error resilience.

The MPEG-4 video VM coder/decoder (codec) is a block- and object-based hybrid coder with motion compensation. Texture is encoded with an 8×8 Discrete Cosine Transformation (DCT) utilizing overlapped block-motion compensation. Object shapes are represented as alpha maps and encoded using a Content-based Arithmetic Encoding (CAE) algorithm or a modified DCT coder, both using temporal prediction. The coder can handle sprites as they are known from computer graphics. Other coding methods, such as wavelet and sprite coding, may also be used for special applications.

Motion compensated texture coding is a well known approach for video coding, and can be modeled as a three-stage process. The first stage is signal processing which includes motion estimation and compensation (ME/MC) and a two-dimensional (2-D) spatial transformation. The objective of ME/MC and the spatial transformation is to take advantage of temporal and spatial correlations in a video sequence to optimize the rate-distortion performance of quantization and entropy coding under a complexity constraint. The most common technique for ME/MC has been block matching, and the most common spatial transformation has been the DCT.

Additionally, in certain situations, coding efficiency may be improved when macroblocks are INTRA coded, e.g., without reference to a temporally subsequent or previous predictor macroblock. INTRA coding may be desirable for an image sequence with rapid motion, a scene change, or rapid changes in lighting conditions, where there may be little frame-to-frame correlation. Coding efficiency may further be improved by differentially encoding the DCT coefficients of a current block using the coefficients of a neighboring block as predictor coefficients.

However, with coding schemes such as MPEG-4, it is possible to have both frame mode and field mode macroblocks next to one another in a video object plane (VOP) or other image area. Additionally, field mode macroblock may be reordered or non-reordered in an adaptive coding scheme. Accordingly, it would be desirable to have a system for selecting predictor coefficients for differentially coding the AC and DC DCT coefficients of a current INTRA coded block, where the current block and/or the neighboring blocks are coded in a frame mode, non-reordered field mode, and/or reordered field mode.

The system should further provide non-linear quantization of DC transform coefficients.

The present invention provides a system having the above and other advantages.

SUMMARY OF THE INVENTION

In accordance with the present invention, a method and apparatus are presented for selecting predictor coefficients for differentially coding the coefficients of a current INTRA coded block.

A method for coding spatial transform coefficients of a current, INTRA coded block in a digital video image includes the step of identifying an adjacent left-hand block, an adjacent top block, and a top, left block which is adjacent to the left-hand block and the top block. The left-hand block, top block, and top, left block each have a DC spatial transform coefficient and a plurality of AC spatial transform coefficients. Additionally, each of the blocks is coded in a coding mode according to a frame mode, a reordered field mode, or a non-reordered field mode. Predictor AC spatial transform coefficients are selected from the left-hand block or the top block for use in differentially encoding the AC spatial transform coefficients of the current block. The selecting step considers the coding mode of the current block and the top block.

In particular, the AC spatial transform coefficients may be selected from the left-hand block when the top block is coded according to the frame mode or the non-reordered field mode, and the current block is coded according to the reordered field mode.

The AC spatial transform coefficients may be selected from the left-hand block when the current block is coded according to the frame mode or the non-reordered field mode, and the top block is coded according to the reordered field mode.

The DC spatial transform coefficient for use in differentially encoding the DC spatial transform coefficient of the current block may be selected from the left-hand block or the top block according to a gradient between the DC spatial transform coefficients of the left block and the top, left block, and a gradient between the DC spatial transform coefficients of the top block and the top, left block.

The AC spatial transform coefficients may be selected from the left-hand block or the top block according to the selected DC spatial transform coefficient.

The AC spatial transform coefficients may be selected from the top block when the DC spatial transform coefficient is selected from the top block, and the current block is coded according to the frame mode or the non-reordered field mode, and the top block is coded according to the frame mode or the non-reordered field mode.

The AC spatial transform coefficients may be selected from the top block when the DC spatial transform coefficient is selected from the top block, and the current block and the top block are both coded according to the reordered field mode.

Zeroed AC spatial transform coefficients may be used in place of the AC spatial transform coefficients from the selected block when the selected block is not INTRA coded.

Furthermore, when the current block resides in a current video object plane (VOP), zeroed AC spatial transform coefficients may be used in place of the AC spatial transform coefficients from the selected block when the selected block does not reside in the current VOP.

The DC coefficients may be non-linearly quantized.

A corresponding decoding method is also presented. The decoder may identify the predictor coefficients independently by performing the selection process used at the encoder, or the decoder may recover a codeword from the transmitted bitstream which identifies the predictor coefficients.

Corresponding apparatus are also presented.

BRIEF DESCRIPTION OF THE DRAWINGS

FIGS. 4(a)–(d) illustrates four possible arrangements of a current block and candidate predictor blocks in accordance with the present invention.

DETAILED DESCRIPTION OF THE INVENTION

A method and apparatus are presented for selecting predictor coefficients for differentially coding the coefficients of a current INTRA coded macroblock. DC and AC coefficients are differentially encoded by selecting predictor DC and AC coefficients from a left-hand neighboring block and a top neighboring block. Each block is coded according to a frame mode, a reordered field mode, or a non-reordered field mode. The AC predictor block is selected according to the respective coding modes of the blocks, and the block in which the DC predictor resides. The top block is selected as an AC predictor when the top block and current block are both reordered field mode, or both frame mode and/or non-reordered field mode, and the DC predictor resides in the top block. Zeroed AC spatial transform coefficients are used in place of the AC spatial transform coefficients from the selected block when the selected block is not INTRA coded, or does not reside in the same Video Object Plane (VOP) as the current block. DC coefficients can similarly be set to a non-zero value in this case.

Figure 1:
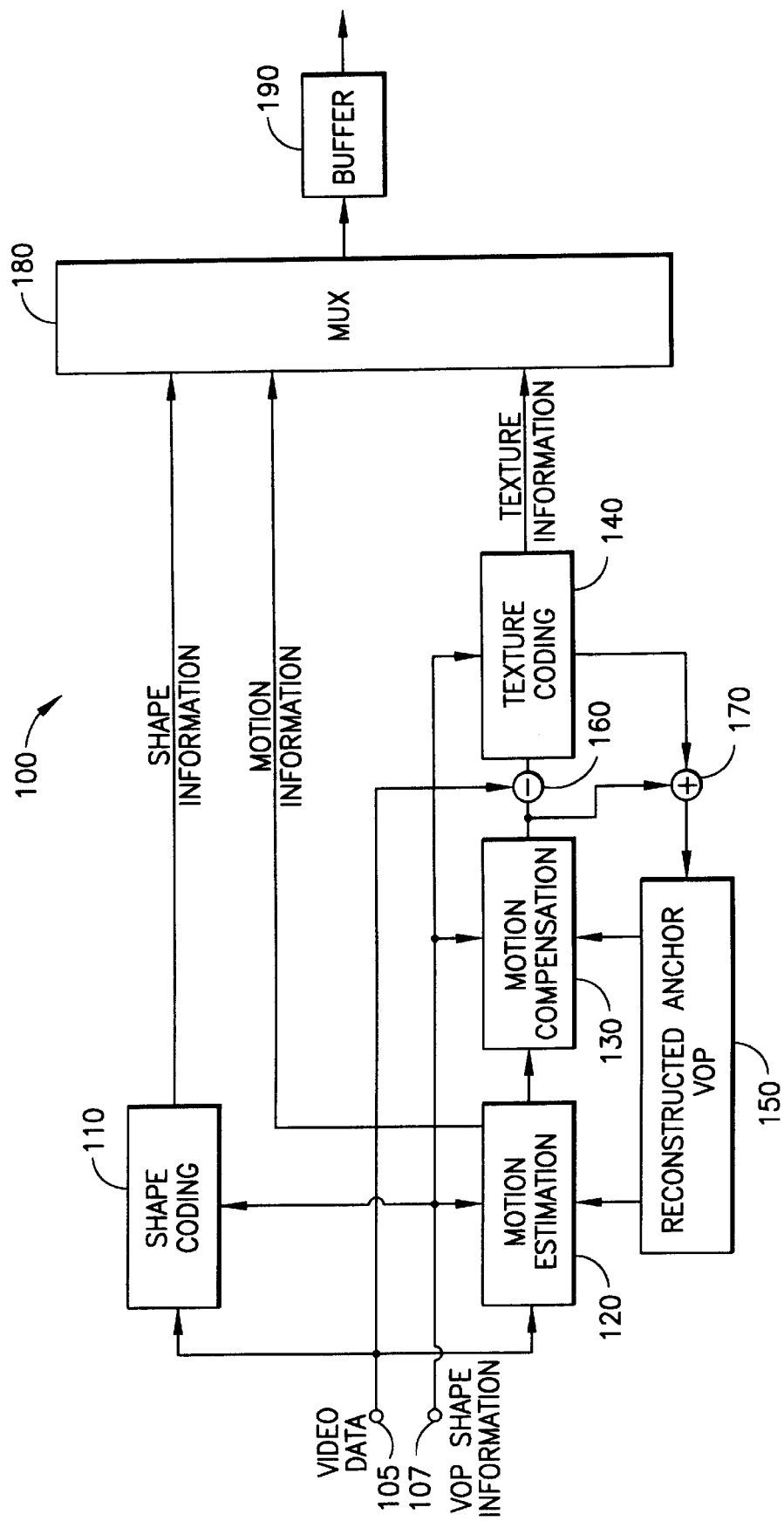
FIG. 1 is a block diagram of an encoder in accordance with the present invention.

FIG. 1 is a block diagram of an encoder in accordance with the present invention. The encoder is suitable for use with video object planes (VOPs) such as those defined in the MPEG-4 standard. VOPs are pictorial elements in a frame. A VOP can have an arbitrary shape, and a succession of VOPs is known as a video object. A full rectangular video frame may also be considered to be a VOP. Thus, the term "VOP" will be used herein to indicate both arbitrary and non-arbitrary (e.g., rectangular) image area shapes. Each pixel in a frame is identified as belonging to a particular VOP.

A VOP may be classified as a predicted VOP (P-VOP), an intra-coded VOP (I-VOP) or a bi-directionally predicted VOP (B-VOP). Moreover, a single VOP may include different types of macroblocks. In particular, a VOP may include a number of macroblocks (MBs) which are coded individually using an intra-frame mode or an inter-frame mode. With intra-frame (INTRA) coding, the MB is coded without reference to a temporally previous or subsequent MB. With inter-frame (INTER) coding, the MB may be differentially coded with respect to a temporally subsequent and/or previous reference (e.g., anchor) frame. The anchor frame (e.g., VOP) for a P-VOP must be another P-VOP or an I-VOP, not a B-VOP. An I-VOP includes self-contained (e.g., intra-coded) blocks which are not predictive coded.

Moreover, both intra-frame and inter-frame coded MBs can be coded in a frame mode, a reordered field mode, or a non-reordered field mode.

B-VOPs can use the forward prediction of P-VOPs as well as backward prediction, bi-directional prediction, and direct mode, which are all inter-frame techniques. B-VOPs do not currently use intra-frame coded MBs under MPEG-4 VM 8.0 referred to previously, although this is subject to change. The anchor frame (e.g., VOP) for a B-VOP must be a P-VOP or I-VOP, but not another B-VOP.

The encoder, shown generally at 100, includes a shape coder 110, a motion estimation function 120, a motion compensation function 130, and a texture coder 140, which each receive video pixel data input at terminal 105. The motion estimation function 120, motion compensation function 130, texture coder 140, and shape coder 110 also receive VOP shape information input at terminal 107, such as the MPEG-4 parameter VOP_of_arbitrary_shape. When this parameter is zero, the VOP has a rectangular shape, and the shape coder 110 therefore is not used.

With INTER coding, a reconstructed anchor VOP function 150 provides a reconstructed anchor VOP for use by the motion estimation function 120 and motion compensation function 130. A current VOP is subtracted from a motion compensated previous VOP at subtractor 160 to provide a residue which is encoded at the texture coder 140. The texture coder 140 performs the DCT on the residue to provide texture information (e.g., transform coefficients) to a multiplexer (MUX) 180. The texture coder 140 also provides information which is summed with the output from the motion compensator 130 at a summer 170 for input to the previous reconstructed VOP function 150.

For INTRA coding, the DCT is performed on the DCT coefficients from the pixel data of a current block, not on a residue. However, as discussed below, the DCT coefficients themselves may be differentially encoded using AC and DC coefficient predictors from a selected block which is adjacent to the current block in the same VOP.

For INTER coded blocks, motion information (e.g., motion vectors) is provided from the motion estimation function 120 to the MUX 180, while shape information which indicates the shape of the VOP is provided from the shape coding function 110 to the MUX 180. The MUX 180 provides a corresponding multiplexed data stream to a buffer 190 for subsequent communication over a data channel.

The pixel data which is input to the encoder may have a YUV 4:2:0 format. The VOP is represented by means of a bounding rectangle. The top left coordinate of the bounding rectangle is rounded to the nearest even number not greater than the top left coordinates of the tightest rectangle. Accordingly, the top left coordinate of the bounding rectangle in the chrominance component is one-half that of the luminance component.

For some video sequences, such as where there is fast motion or a scene change, it may be more efficient (i.e., use fewer bits) to directly code the pixel intensity values of a current block instead of using inter-VOP differential encoding. Accordingly, it is desirable to have a decision criteria for adaptively choosing to code the current block directly (e.g., INTRA mode) or differentially (e.g., INTER mode). The following parameters are calculated to make the INTRA/INTER decision:

$$mean = \frac{1}{N^2}\sum_{i=0}^{N-1}\sum_{j=0}^{N-1} c(i,j) \text{ and } A = \sum_{i=0}^{N-1}\sum_{j=0}^{N-1} |c(i,j) - mean|,$$

where N is the size of the block (e.g., N=16 for a 16×16 macroblock). The term c(i,j) represents the current macroblock luminance samples, where "i" is a horizontal index, and "j" is a vertical index. The INTRA mode is chosen if $$A < (SAD_{inter}(MV_x, MV_y) - 2*Nc);$$

otherwise, the INTER mode is used. $SAD_{inter}$ is the sum of the absolute differences taken on a pixel-by-pixel basis between the pixels of the current macroblock and the pixels of the best match macroblock. The best match macroblock is referenced by the horizontal and vertical motion vectors, $MV_x$ and $MV_y$, respectively. Nc is the number of pixels in the current VOP. A VOP typically comprises several macroblocks. Note that the MV in $SAD_{inter}(MV_x, MV_y)$ for this decision is at integer pixel resolution. If the INTRA mode is chosen, no further operations are necessary for the motion search. If the INTER mode is chosen, the motion search continues for a half-pixel resolution MV.

Figure 2:
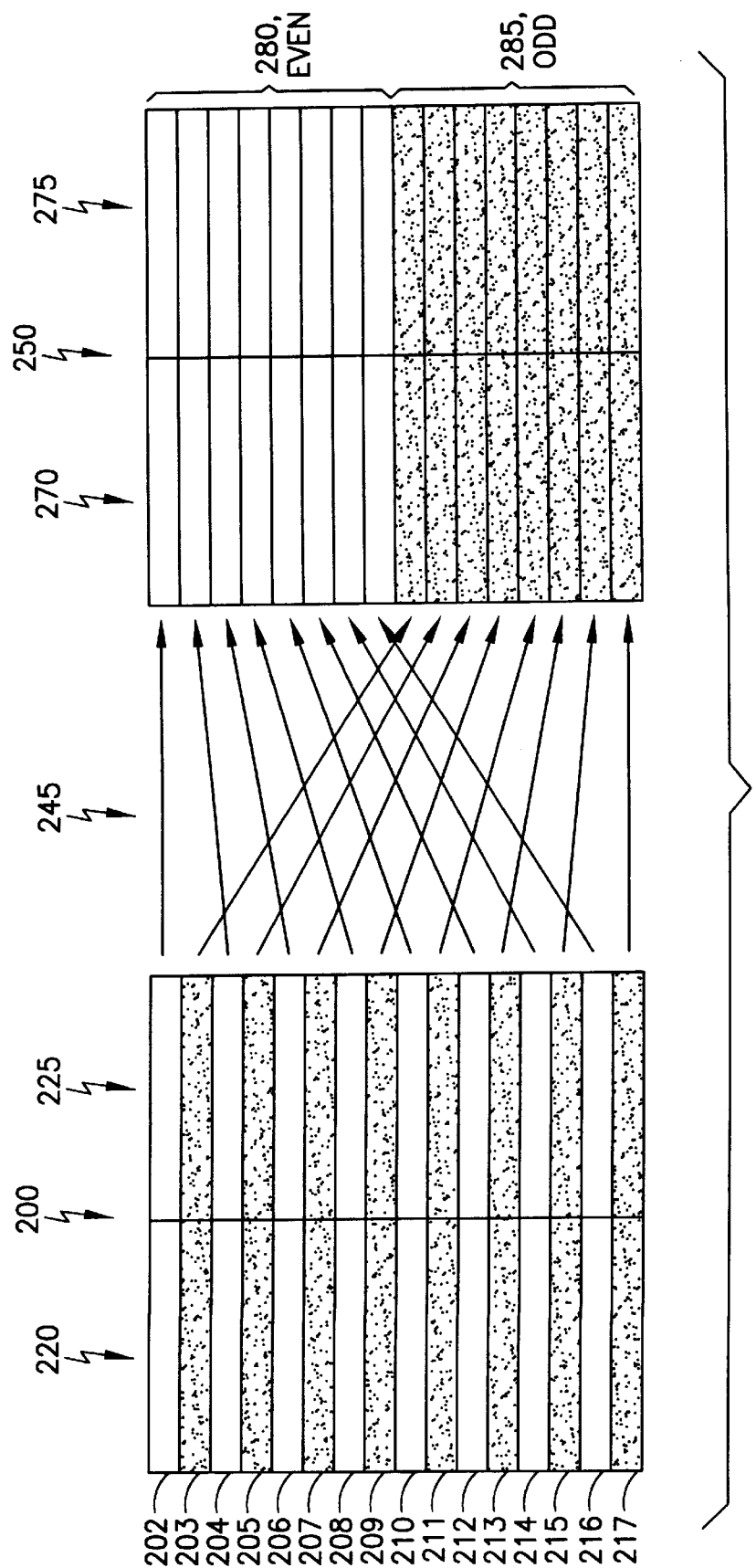
FIG. 2 illustrates reordering of pixel lines in an adaptive frame/field DCT scheme in accordance with the present invention.

FIG. 2 illustrates reordering of pixel lines in an adaptive frame/field DCT scheme in accordance with the present invention.

When interlaced (i.e., field mode) video is coded, superior energy compaction can sometimes be obtained by reordering the lines of a macroblock to form 8×8 luminance blocks consisting of data from one field. The DCT is then performed on the reordered macroblock which comprises same-field pixel lines (i.e., either top of bottom fields). Field DCT line order is used when $$\sum_{i=0}^{6}\sum_{j=0}^{15} (P_{2i,j} - P_{2i+1,j})^2 + (P_{2i+1,j} - P_{2i+2,j})^2 >$$

$$\sum_{i=0}^{6}\sum_{j=0}^{15} (P_{2i,j} - P_{2i+2,j})^2 + (P_{2i+1,j} - P_{2i+3,j})^2$$

where $p_{i,j}$ are the spatial luminance data samples for INTRA coding (or differences for INTER coding) just before the 8×8 DCT is performed. The terms "i" and "j" are horizontal and vertical indexes, respectively. The field DCT permutation is indicated when the MPEG-4 flag dct_type=1 (i.e., reordered field mode). Non-reordered field mode, and frame mode, are indicated by dct_type=0. The decision to reorder lines is made after the decision to use INTRA or INTER coding.

When field DCT mode is used, the luminance lines for INTRA mode (or luminance error for INTER mode) in the spatial domain of the macroblock are permuted from the frame DCT orientation to field DCT configuration. The resulting macroblock is transformed, quantized and VLC encoded normally. On decoding a field DCT macroblock, the inverse permutation is performed after all luminance blocks have been obtained from the IDCT. In the 4:2:0 format, chrominance data are not effected by this mode.

A field mode image, e.g., a 16×16 macroblock (MB), is shown generally at 20. The MB includes even-numbered lines 202, 204, 206, 208, 210, 212, 214 and 216, and odd-numbered lines 203, 205, 207, 209, 211, 213, 215 and 217. The even and odd lines are thus interleaved, and form top and bottom fields, respectively.

When the pixel lines in image 200 are permuted to form same-field luminance blocks, the MB shown generally at 250 is formed. Arrows, shown generally at 245, indicate the reordering of the lines 202–217. For example, the even line 202, which is the first line of MB 200, is also the first line of MB 250. The even line 204 is reordered as the second line in MB 250. Similarly, the even lines 206, 208, 210, 212, 214 and 216 are reordered as the third through eighth lines, respectively, of MB 250. Thus, a 16×8 luminance region 280 with even-numbered lines is formed. Similarly, the odd-numbered lines 203, 205, 207, 209, 211, 213, 215 and 217 form a 16×8 region 285.

For texture coding, an 8×8 DCT is performed on the two blocks in the top region 280, and the two blocks in the bottom region 285. A separable two-dimensional DCT is used. As described below, further coding efficiencies can be achieved for INTRA blocks by differentially encoding the DCT coefficients using predictor coefficients from blocks which are adjacent to the current block.

Figure 3:
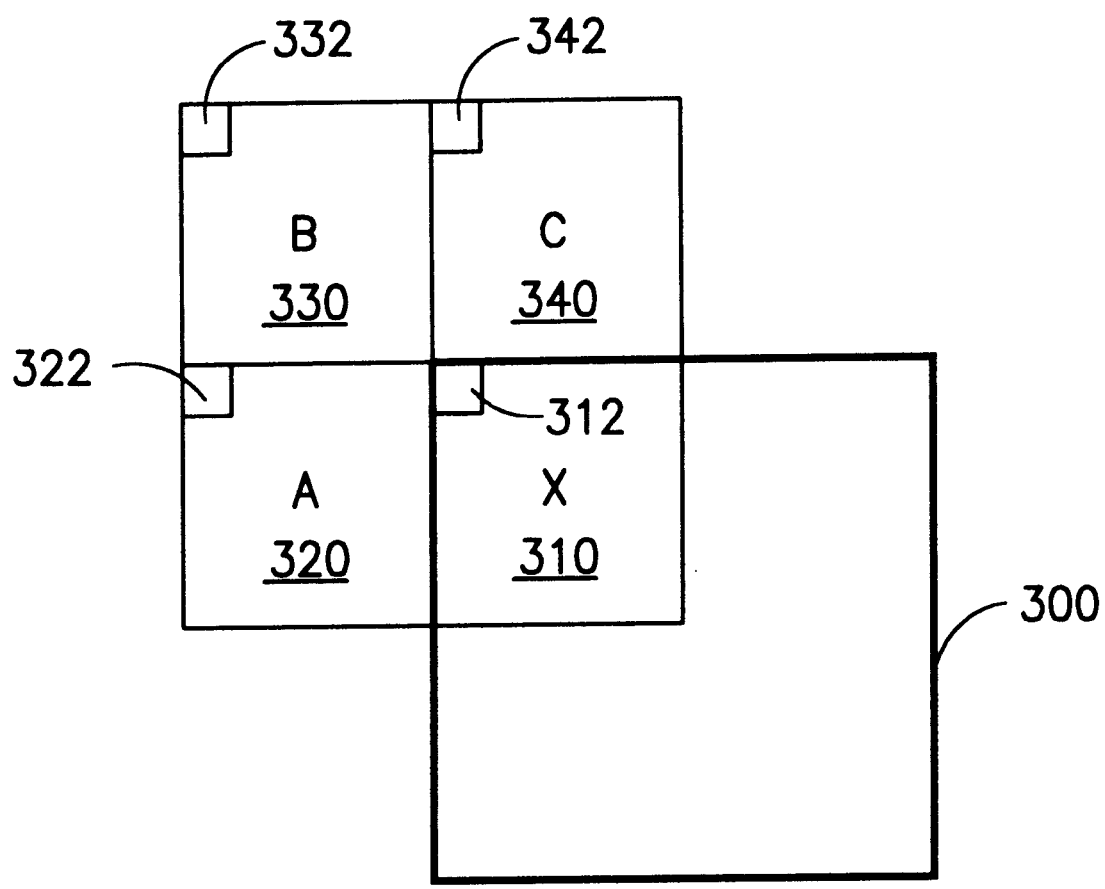
FIG. 3 illustrates DC coefficient prediction for an INTRA coded block in accordance with the present invention.

FIG. 3 illustrates DC coefficient prediction for an INTRA coded block in accordance with the present invention. DC coefficient prediction is not affected by whether a block is frame mode or field mode. Before entropy coding, lossless prediction of quantized DC and some AC coefficients of the DCT is performed to concentrate the coefficient distribution around zero so that entropy coding can be more efficient. The adaptive DC prediction method for a current block involves selection of either the quantized DC (QDC) value of a block which is to the left of the current block, or the block which is immediately above the current block, i.e., in the previous row.

Furthermore, quantization of the DC coefficients may be linear or non-linear. For linear quantization, with a quantizer step-size for the DC coefficient of the luminance and chrominance components of eight, QDC=dc//8, where "dc" is an 11-bit unquantized transform coefficient value from the DCT. "//" denotes rounded division.

Non-linear quantization for DC coefficients of an intra-macroblock is described with reference to Table 1.

TABLE 1

| Component | dc_scaler for Quantizer (Qp) range | | | |
|---|---|---|---|---|
| Type | 1 through 4 | 5 through 8 | 9 through 24 | 25 through 31 |
| Luminance | 8 | 2Qp | Qp + 8 | 2Qp − 16 |
| Chrominance | 8 | (Qp + 13)/2 | | Qp − 6 |

A non-linear scaler parameter (dc_scaler) for DC coefficients of DCT blocks, is expressed in terms of a piece-wise relationship with a quantization level, Qp. DC coefficients of luminance and chrominance blocks are quantized by corresponding non-linear scalers. For example, for a luminance block with a Qp range of 1–4, dc_scaler=8. For a luminance block with a Qp value of 6, dc_scaler=2*Qp=12. Then, the forward quantization is performed using QDC=dc//dc_scaler, and the reconstructed DC values are computed using dc=dc_scaler*QDC.

Adaptive selection of the DC predictor coefficient is based on a comparison of horizontal and vertical QDC value gradients around the current block. For example, assume that block X 310 is an 8×8 block of DCT coefficients in an INTRA macroblock 300 which is currently being coded. Block X includes a DC coefficient 312. Block A 320 is an 8×8 block which is the immediate left-hand neighbor of X, block C 340 is an 8×8 block which is the immediate top neighbor of block X, and block B 330 is an 8×8 block that is the immediate left-hand neighbor of block C. Block A includes a DC coefficient 322, block C includes a DC coefficient 342, and block B includes a DC coefficient 332.

For linear quantization of DC coefficients, the QDC predictor value of block X, $QDC'_X$, is obtained from either the QDC value of block A, $QDC_A$, or the QDC value of block C, $QDC_C$, based on a comparison of horizontal and vertical QDC gradients. In particular, if $(|QDC_A - QDC_B| < |QDC_B - QDC_C|)$, then $QDC'_X = QDC_C$. Otherwise, $QDC'_X = QDC_A$.

A differential DC value, $DQDC_X$, is then obtained as follows: $DQDC_X = QDC_X - QDC'_X$. The differential DC value is variable length coded and transmitted in a bitstream to a decoder. The process is independently repeated for every block of a macroblock, and then for each macroblock in a VOP or frame. At the decoder, the full DC coefficient is obtained from the operation $QDC_X = DQDC_X + QDC'_X$.

If any of the blocks A, B, or C are outside of a VOP or frame boundary, or they do not belong to an INTRA coded macroblock, their QDC prediction values are assumed to take a value of $2^{(bits\_per\_pixel-1)}$. For example, with bits_per_pixel=8, a value of $2^7=128$ is used. The DC prediction block is selected in a similar manner for the luminance and each of the two chrominance components of a block.

The above scheme for linear quantization is modified for non-linear quantization of DC coefficients when dc_scaler is different for blocks A 320, B 330 and C 340. That is, dc_scaler is not the same for each of the three blocks. This may occur since the quantization level can change from macroblock to macroblock. A solution is to use the following rule for DC prediction.

if $$(|QDC_A^{(1)} - QDC_B^{(1)}| < |QDC_B^{(1)} - QDC_C^{(1)}|) QDC_X = QDC_C^{(1)}$$

else $$QDC_X = QDC_A^{(1)}.$$

where $QDC_X = dc_X // dc\_scalar_X,$ $QDC_A^{(1)} = (QDC_A * dc\_scalar_A) // dc\_scalar_X,$ and $QDC_A = dc_A // dc\_scalar_A,$ $QDC_B^{(1)} = (QDC_B * dc\_scalar_B) // dc\_scalar_X,$ and $QDC_B = dc_B // dc\_scalar_B,$ $QDC_C^{(1)} = (QDC_C * dc\_scalar_C) // dc\_scalar_X,$ and $QDC_C = dc_C // dc\_scalar_C.$ Essentially, the QDC values are scaled according to the quantization levels of the macroblock in which the DC coefficient resides and the macroblock in which the selected prediction block resides. Generally, dc_scaler is assigned on a MB by MB basis. The parameters QDC and Qp can be transmitted to a decoder in a digital bitstream. Qp is differentially encoded from MB to MB and transmitted as the MPEG-4 parameter DQUANT. At the decoder, Qp is obtained from DQUANT, and dc_scaler is obtained from Qp according to Table 1. The QDC predictor is determined by re-calculating the horizontal and vertical gradients and considering the other predictor selection criteria, and, finally, the scaled QDC value, $QDC^{(1)}$, is obtained using the non-scaled QDC value and the dc_scaler values.

FIGS. 4(a)–4(d) illustrate four possible arrangements of a current block and potential predictor blocks in accordance with the present invention. Selection of a DC coefficient predictor is not affected by the relative position of the current block X in the macroblock.

Figure 4A:
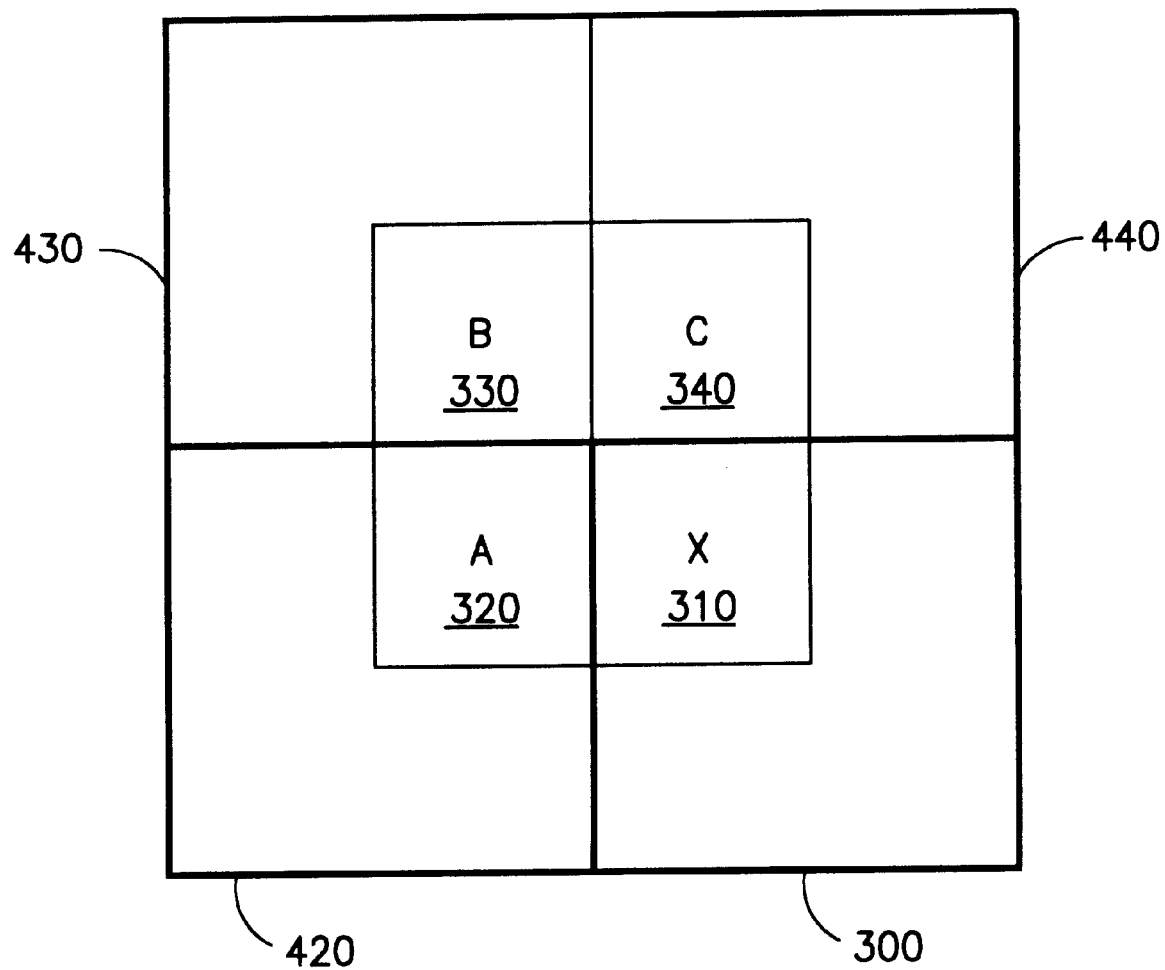

FIG. 4(a) shows a first arrangement which corresponds to the arrangement of FIG. 3. Specifically, block X 310, which is the block currently being coded, is the upper left-hand block of the macroblock 300, block A 320 is the upper right-hand block of a macroblock 420, block B is the lower right-hand block of a macroblock 430, and block C 340 is the lower left-hand block of a macroblock 440.

FIG. 4(b) shows a second arrangement, where the block X 310 is the upper right-hand block of the macroblock 300, block A 320 is the upper left-hand block of the macroblock 300, block B 330 is the lower left-hand block of the macroblock 440, and block C is the lower right-hand block of the macroblock 440.

Generally, all blocks in the same macroblock are either all frame mode, all field mode without reordering, or all field mode with reordering. Additionally, all blocks in the same macroblock are either INTRA mode or INTER mode. Moreover, blocks in adjacent macroblocks may have different modes. Thus, in FIG. 4(b), block A 320 and block X 310 are either both frame mode, both field mode without reordering, or both field mode with reordering. Similarly, block B 330 and block C 340 are either both frame mode, both field mode without reordering, or both field mode with reordering.

FIG. 4(c) shows a third arrangement, where the block X 310 is the lower left-hand block of the macroblock 300, block A 320 is the lower right-hand block of the macroblock 420, block B is the upper right-hand block of the macroblock 420, and block C is the upper left-hand block of the macroblock 420. Block A 320 and block B 330 are either both frame mode, both field mode without reordering, or both field mode with reordering. Similarly, block X 310 and block C 340 are either both frame mode, both field mode without reordering, or both field mode with reordering.

FIG. 4(d) shows a fourth arrangement, where the block X 310 is the lower right-hand block, block A 320 is the lower left-hand block, block B 330 is the upper left-hand block, and block C 340 is the upper right-hand block, each in the macroblock 300. Since each of the blocks A, B, C and D are in the same macroblock, they are all frame mode, all field mode without reordering, or all field mode with reordering.

Figure 5:
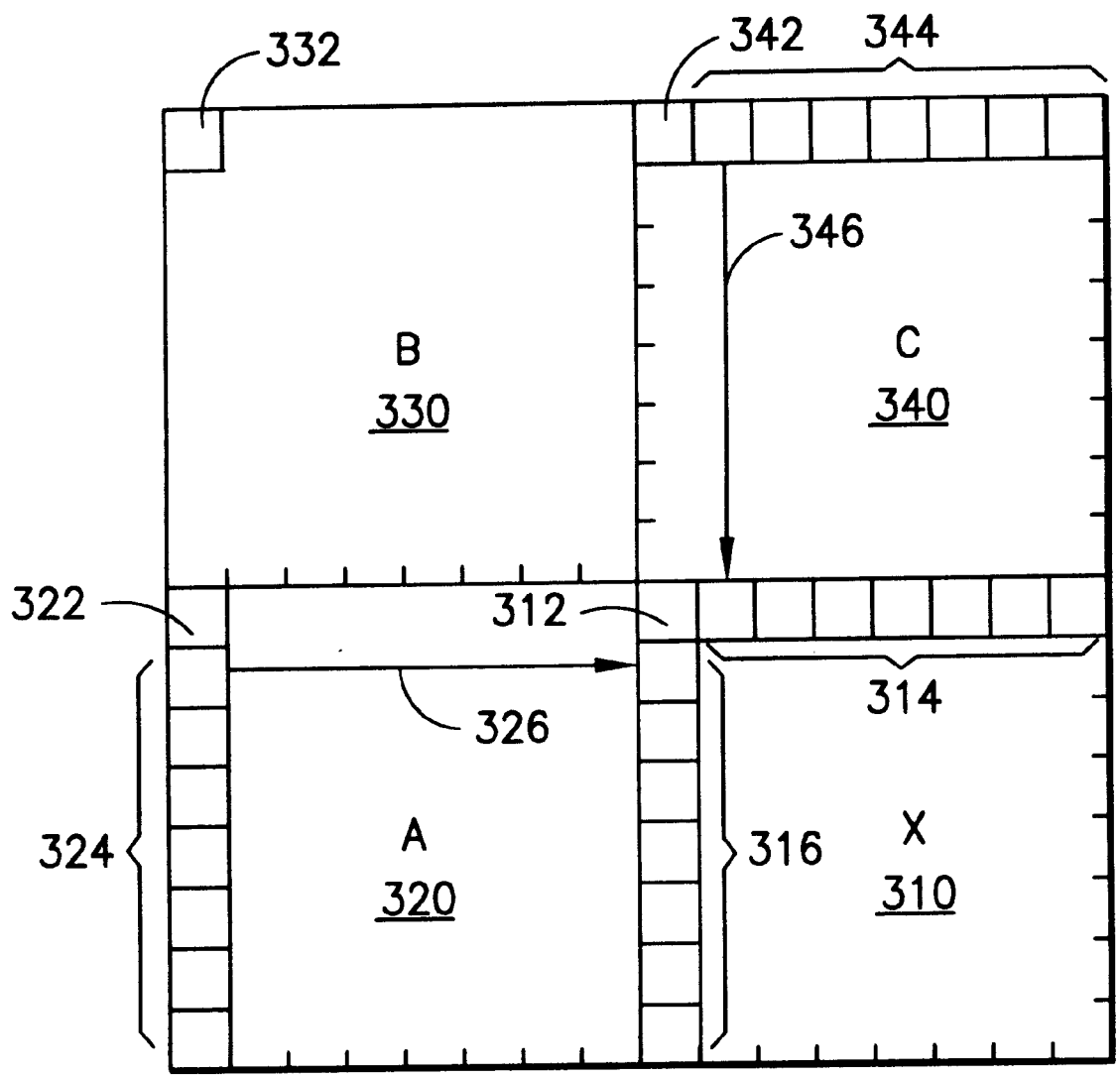
FIG. 5 illustrates AC coefficient prediction for an INTRA coded block in accordance with the present invention.

FIG. 5 illustrates AC coefficient prediction for an INTRA coded block in accordance with the present invention. With AC prediction, either the left-hand neighboring block or the top neighboring block is selected for use in differentially encoding the AC DCT coefficients of a current block. Those skilled in the art will recognize that all coefficients in a DCT block are AC coefficients, except the upper left-hand coefficient, which is a DC coefficient. Thus, for an 8×8 block, there are sixty-three AC coefficients and one DC coefficient. "DC" refers to direct current, which describes a steady state coefficient energy, while "AC" refers to alternating current, which describes a coefficient energy which varies relative to the DC level.

Typically, the distribution of energy in the AC coefficients is such that many coefficients near the lower right-hand portion of a block have a zero or near-zero value, and therefore need not be differentially encoded, while the coefficients near the upper left-hand portion of a block are differentially encoded.

No macroblock boundary is shown in FIG. 5 since the blocks may assume one of the four arrangements as shown in FIGS. 4(*a*)–(*d*). Additionally, while each block includes sixty-four coefficients, not all are individually shown. Block X 310 includes a first row of AC coefficients 314 and a first column of AC coefficients 316, block C includes a first row of AC coefficients 344, and block A includes a first column of AC coefficients 324.

Either DC coefficient 322 in block A 320 or DC coefficient 342 in block C 340 will be selected as the predictor for the DC coefficient 312 in block X 310. Moreover, AC coefficients from either the first row or the first column of a previous coded block (i.e., within the same VOP) are used to predict the corresponding coefficients of the current block.

For each block, the selected direction for DC coefficient prediction is also used to select the direction for AC coefficient prediction when the current block and the predictor block have the same dct_type. That is, when the current block and the predictor block both have a dct_type=0 (i.e., non-reordered field mode, or frame mode) or dct_type=1 (i.e., reordered field mode), the AC coefficients of the DC predictor block are used to differentially encode the AC coefficients of the current block. The MPEG-4 flag "dct_type" was discussed above in connection with FIG. 2.

In a first example, assume the current block, block X 310, is arranged as shown in FIG. 4(*a*). If blocks X, A and C have the same dct_type, then the AC coefficients of the DC predictor block are used to differentially encode the AC coefficients of the current block.

For example, if block C 340 is the DC predictor block, then the first row of AC coefficients 344 of block C is used to predict the first row of the AC coefficients 314 of block X on a coefficient-by-coefficient basis. That is, the first AC coefficient of row 344 is used to predict the first AC coefficient of row 314 as indicated by arrow 346, the second AC coefficient of row 344 is used to predict the second AC coefficient of row 314, and so forth. Similarly, the second row of AC coefficients of block C 340 is used to predict the second row of the AC coefficients of block X 310, and so forth, until the last row of AC coefficients of block C is used to predict the last row of the AC coefficients of block X. Note that the first row of each block has seven AC coefficients, while the remaining rows have eight AC coefficients.

Alternatively, still assuming blocks X, A and C all have the same dct_type, if block A is the DC predictor block, then the first column of AC coefficients 324 of block C is used to predict the first column 316 of the AC coefficients of block X on a coefficient-by-coefficient basis. For example, the first AC coefficient of column 324 is used to predict the first AC coefficient of column 316 as indicated by arrow 326. Similarly, the second column of AC coefficients of block A is used to predict the second column of the AC coefficients of X and so forth, until the last column of AC coefficients of block A is used to predict the last column of the AC coefficients of block X. Note that the first column of each block has seven AC coefficients, while the remaining columns have eight AC coefficients.

Still assuming the arrangement of FIG. 4(*a*) is used, if block X and block C have different dct_types, then block A is selected as the AC predictor block, regardless of the DC predictor block. Block A is selected as the AC predictor in this case even if block A and block X have different dct_types, since the reordering of lines in a reordered field mode block does not significantly affect the distribution of horizontal spatial frequencies relative to a non-reordered field mode block or a frame mode block. Accordingly, an improved coding efficiency can still be expected by using block A as an AC predictor block.

If block X and block C have the same dct_type, but block X and block A have different dct_types, then block C is selected as the AC predictor block, regardless of the DC predictor block.

Thus, it is possible for the DC predictor to come from block C, for example, while the AC predictors are from block A. Alternatively, it is possible for the DC predictor to come from block A, while the AC predictors are from block C.

Generally, the reason for avoiding block C as an AC predictor block when block C and block X have different dct_types is that reordering of the pixel lines changes the vertical distribution of spatial energy in a block, so the correlation between the spatial frequencies between two blocks with different dct_types is significantly reduced.

For example, assume block X is an image of a fast-moving object with a vertical boundary which moves horizontally across the block. In this situation, block X may be coded as a reordered field mode block to avoid a zippering or zigzag effect of the vertical boundary. Such zippering, which is caused by a temporal delay between the top and bottom fields, is manifested as a vertical zigzag line in the block. However, if the vertical boundary of the moving image did not extend into block C, block C may be coded in non-reordered field mode, or in frame mode. In this case, block C cannot provide good AC predictor coefficients for block X due to poor correlation of the AC coefficients, so block A is used as the AC predictor block. Block A will generally provide a higher correlation.

In a second example, assume the current block is arranged as shown in FIG. 4(*b*). Here, blocks A and X have the same dct_type as one another, and blocks B and C have the same dct_type as one another. If blocks X and C also have the same dct_type as one another, then the AC coefficients of the DC predictor block are used to differentially encode the AC coefficients of the current block. If blocks X and C have different dct_types, then block A is used as the AC predictor block, regardless of the DC predictor block.

In a third example, assume the current block is arranged as shown in FIG. 4(*c*). Blocks X and C have the same dct_type as one another, and blocks A and B have the same dct_type as one another. If blocks X and A also have the same dct_type as one another, then the AC coefficients of the DC predictor block are used to differentially encode the AC coefficients of the current block. If blocks X and A have different dct_types, then block C is used as the AC predictor block, regardless of the DC predictor block.

In a fourth example, assume the current block is arranged as shown in FIG. 4(d). Blocks A, B, C and X all have the same dct_type since they are in the same macroblock 300. Thus, the AC coefficients of the DC predictor block are used to differentially encode the AC coefficients of the current block.

As a general rule, block C is used as the AC predictor block only when block X and block C have the same dct_type, and the DC predictor is from block C. Otherwise, block A is used as the AC predictor block. Moreover, AC predictions are performed similarly for the luminance and each of the two chrominance components.

Note that when block A would be selected by default (i.e., when block X and block C have different dct_types), but there is no block A in reality, such as when block X is in the left half of the first macroblock in a row, zero is used for the AC predictors.

In the examples of FIGS. 4 and 5, each block is assumed to be INTRA coded, and within a common VOP boundary. However, if any of the blocks A, B or C are outside of the VOP boundary in which block X is contained, or do not belong to an INTRA coded macroblock, their quantized AC (QAC) values are assumed to take a value of zero for the purpose of computing prediction values. The QDC values are set to a non-zero constant, as discussed.

Furthermore, to compensate for differences in the quantization of previous horizontally adjacent or vertically adjacent blocks used in AC prediction of the current block, scaling of prediction coefficients is required. The prediction is modified so that the predictor is scaled by the ratio of the current quantization step size and the quantization step size of the predictor block.

In particular, if block A was selected as the AC predictor for the current block (e.g., block X), the scaled horizontal AC prediction is:

$$QAC_{iOX'} = \frac{QAC_{iOA} \times QP_A}{QP_X}$$

where $QAC_{iOA}$ is the non-scaled quantized AC value for the (i,0)th coefficient, $QP_A$ is the quantization parameter for block A, and $QP_X$ is the quantization parameter for block X.

If block C was selected as the AC predictor, the scaled vertical AC prediction is:

$$QAC_{0jX'} = \frac{QAC_{0jC} \times QP_C}{QP_X}$$

where $QAC_{j0C}$ is the non-scaled quantized AC value for the (0,j) th coefficient, $QP_C$ is the quantization parameter for block C, and $QP_X$ is the quantization parameter for block X. The pair (i,j) denotes a particular coefficient in a block by the horizontal "i" position, and the vertical "j" position. For example, (i,j)=(0,0) denotes the upper left-hand coefficient in a block, and (i,j)=(8,8) denotes the lower right-hand coefficient in a block.

If block A or block C are outside of the VOP in which block X resides, then the corresponding QP values are assumed to be equal to $QP_X$.

Although differential encoding of DCT coefficients in an INTRA block as discussed in connection with FIGS. 3–5, in particular, can usually improve coding efficiency by reducing the amount of data needed to represent the block, this is not always the case. Thus, when AC coefficient prediction results in a larger magnitude error signal as compared to the original signal, it is desirable to disable AC prediction. However, to avoid excessive overhead data, AC prediction can be switched on or off on a macroblock-by-macroblock basis rather than on a block-by-block basis.

The decision for switching AC prediction on or off is based on a comparison of the sum of the absolute values of all AC coefficients to be predicted in a macroblock, and the sum of the absolute values of the predicted differences. In particular, if block A is selected as the AC predictor block, a criterion S is calculated, as follows:

$$S = \left( \sum_{i=1}^{7} |QAC_{iOX}| - \sum_{i=1}^{7} |QAC_{iOX} - QAC_{iOX'}| \right)$$

If block C is selected as the DC predictor for the current block, the criterion S is calculated, as follows:

$$S = \left( \sum_{j=1}^{7} |QAC_{0jX}| - \sum_{j=1}^{7} |QAC_{0jX} - QAC_{0jX'}| \right)$$

Next, for all blocks in the macroblock for which a common decision is to be made, a single $\Sigma S$ is calculated and a flag, such as the MPEG-4 flag "ACpred_flag" is either set/reset to enable/disable AC prediction. In particular, if ($\Sigma S \geq 0$), set ACpred_flag=1 to enable AC prediction. Otherwise, set ACpred_flag=0 to disable AC Prediction. DC prediction is still enabled in either case. ACpred_flag is transmitted to the decoder for use in recovering the DCT coefficients of each block.

Figure 6:
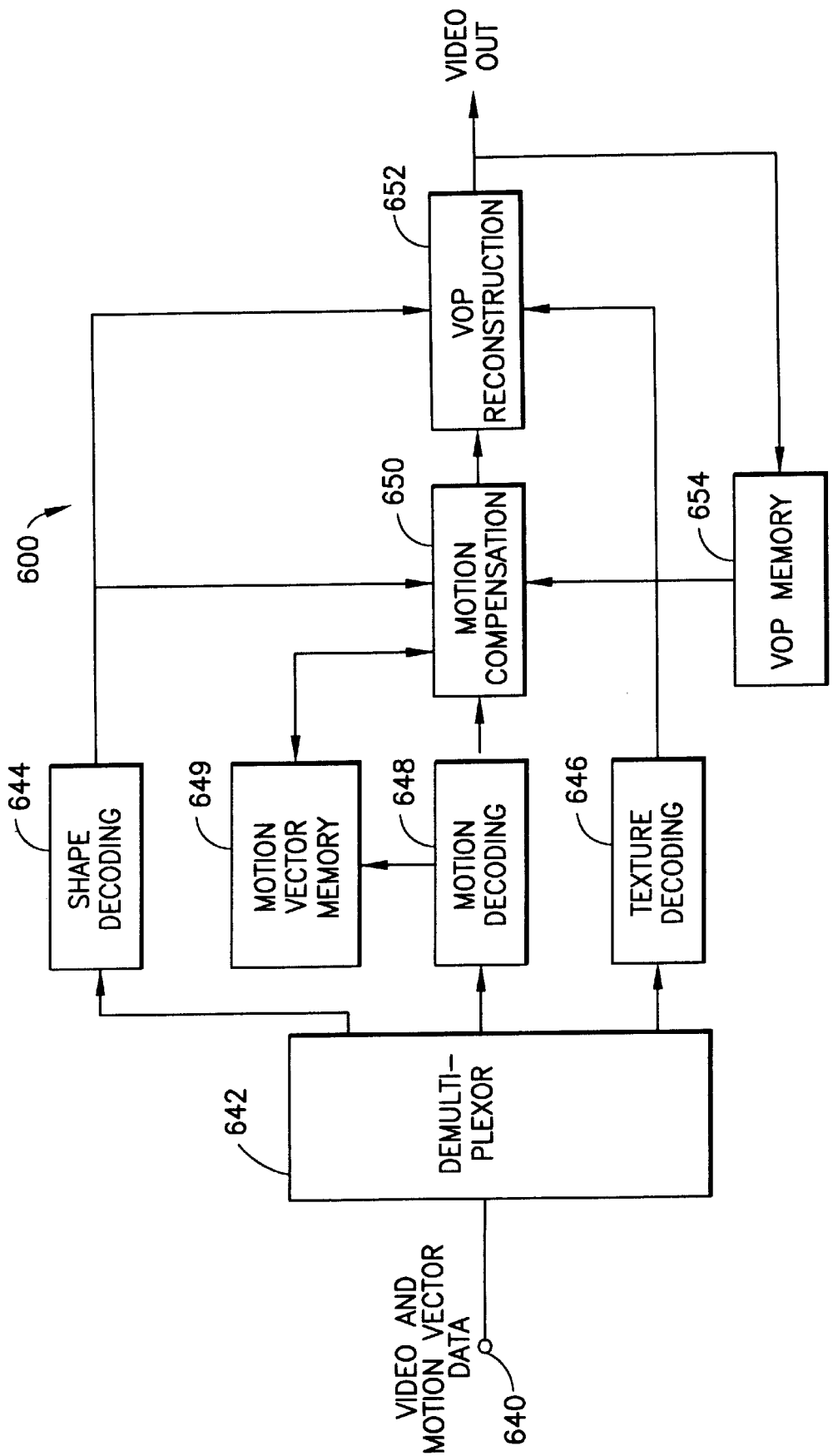
FIG. 6 is a block diagram of a decoder in accordance with the present invention.

FIG. 6 is a block diagram of a decoder in accordance with the present invention. The decoder, shown generally at 600, can be used to receive and decode the encoded data signals transmitted from the encoder of FIG. 1. The encoded video image data and differentially encoded motion vector (MV) data are received at terminal 640 and provided to a demultiplexer (DEMUX) 642. For INTER macroblocks, the encoded video image data is differentially encoded in DCT transform coefficients as a prediction error signal (e.g., residue). For INTRA macroblocks, the video image itself is not differentially encoded, but the DCT coefficients may be differentially encoded using neighboring transform coefficients in the same VOP, i.e., according to ACpred_flag.

A shape decoding function 644 processes the data when the VOP has an arbitrary shape to recover shape information, which is, in turn, provided to a motion compensation function 650 and a VOP reconstruction function 652. A texture decoding function 646 performs an inverse DCT on transform coefficients to recover residue information for INTER coded macroblocks.

For INTRA coded macroblocks (MBs), pixel information is recovered directly and provided to the VOP reconstruction function 652. In particular, when ACpred_flag=0, the inverse DCT at the texture decoding function 646 recovers the AC coefficients of the current block directly since the AC coefficients are not differentially encoded. The DC coefficient is differentially encoded using the DC coefficient (e.g., predictor) of either the top or left-hand block. The DC predictor may be zeroed when the selected predictor block is outside the current VOP, or is from an INTER coded block. The full DC coefficient is recovered by summing the differentially encoded DC coefficient of the current block with the predictor DC coefficient, i.e., according to the operation $QDC_x = DQDC_x + QDC'_x$.

For INTRA coded macroblocks with ACpred_flag=1, both the AC and DC coefficients of the current block are differentially encoded. The DC coefficient is recovered as discussed above for the case when ACpred_flag=0. The full AC coefficients are recovered by performing the inverse DCT to obtain the differentially encoded AC coefficients of the current block, and summing the differentially encoded AC coefficients with the corresponding AC coefficients of the predictor block, i.e., according to the operation $QAC_x = DQAC_x + QAC'_x$. The AC predictor may be zeroed when the selected predictor block is outside the current VOP or is in an INTER coded block Thus, for INTRA coded blocks, it is necessary for the decoder to identify the proper predictor block separately for the AC and DC coefficients. This can be achieved by providing a codeword or codewords in the bitstream for each macroblock which indicates the predictor block. For example, a codeword of "00" may indicate that the top block is the predictor for both AC and DC coefficients, a codeword of "01" may indicate that the left-hand block is the predictor for both AC and DC coefficients, a codeword of "10" may indicate that the left-hand block is the predictor for the DC coefficient while the top block is the predictor for the AC coefficients, and a codeword of "11" may indicate that the left-hand block is the predictor for the AC coefficient while the top block is the predictor for the DC coefficients.

Additionally, other bits or codewords or the like may be used to indicate that a zeroed predictor is to be used for either the DC or AC coefficients. Or, the decoder may independently check to see if a selected predictor block is INTER coded or outside the current VOP, and set the predictor coefficients to zero or to a non-zero constant as required.

Alternatively, the texture decoding function 646 at the decoder 600 may independently perform the selection algorithm discussed above in connection with FIGS. 3–5 to determine the correct predictor coefficients. In this case, the texture decoding function 646 may have a memory for storing the decoded DCT coefficients of the left, top, and top, left blocks for use in processing the current block. The flag dct_type must also be available for each macroblock in this case. Appropriate circuitry can be implemented in software, firmware, or hardware to identify the desired predictor coefficients in order to decode the current block.

For INTER coded blocks and MBs, such as those in B-VOPs, the pixel information provided from the texture decoding function 646 to the reconstructed VOP function 652 represents a residue between the current MB and a reference image. The reference image may be pixel data from a single anchor MB which is indicated by a forward or backward MV. Alternatively, for an interpolated MB, the reference image is an average of pixel data from two reference MBs, e.g., one past anchor MB and one future anchor MB. In this case, the decoder must calculate the averaged pixel data according to the forward and backward MVs before recovering the current MB pixel data.

For INTER coded blocks and MBs, a motion decoding function 648 processes the encoded MV data to recover the differential MVs and provide them to the motion compensation function 650 and to a motion vector memory 649, such as a RAM. The motion compensation function 650 receives the differential MV data and determines a PMV according to the coding mode and pmv[ ] index of the current MB and the previous MB, in bitstream order.

Once the motion compensation function 650 determines a full reference MV and sums it with the differential MV of the current MB, the full MV of the current MB is available. Accordingly, the motion compensation function 650 can now retrieve anchor frame best match data from a VOP memory 654, such as a RAM, calculate an averaged image if required, and provide the anchor frame pixel data to the VOP reconstruction function to reconstruct the current MB.

The retrieved or calculated best match data is added back to the pixel residue at the VOP reconstruction function 652 to obtain the decoded current MB or block. The reconstructed block is output as a video output signal and also provided to the VOP memory 654 to provide new anchor frame data.

Figure 7:
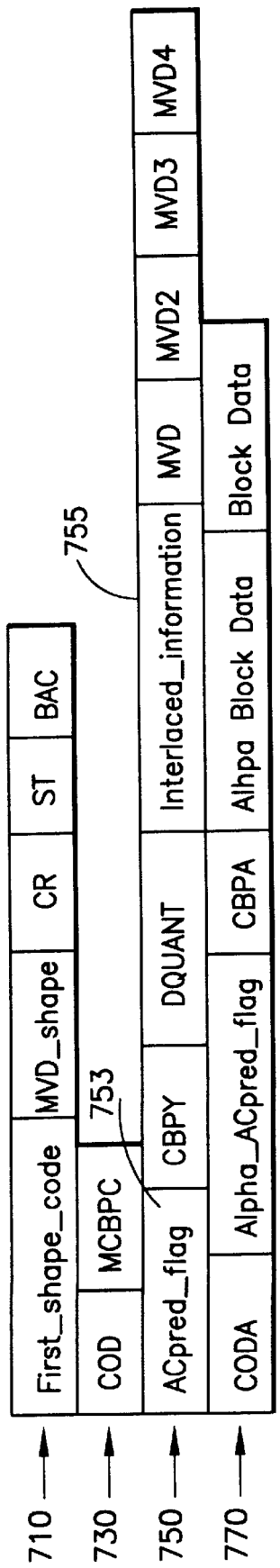
FIG. 7 illustrates a macroblock packet structure in accordance with the present invention.

FIG. 7 illustrates a macroblock packet structure in accordance with the present invention. The structure indicates the format of data received by the decoder. Note that the packets are shown in four rows for convenience only. The packets are actually transmitted serially, starting from the top row, and from left to right within a row. A first row 710 includes fields first_shape_code, MVD_shape, CR, ST and BAC. A second row 730 includes fields COD and MCBPC. A third row 750 includes fields ACpred_flag 753, CBPY, DQUANT, Interlaced_information, MVD, MVD2, MVD3 and MVD4. A fourth row 770 includes fields CODA, Alpha_ACpred_flag, CBPA, Alpha Block Data and Block Data. Each of the above fields is defined according to MPEG-4 VM 8.0.

The term first_shape_code indicates whether a MB is in a bounding box of a VOP. CR indicates a conversion ratio for Binary Alpha Blocks. ST indicates a horizontal or vertical scan order. BAC refers to a binary arithmetic codeword.

COD and CODA refer to gray scale shape coding. MCBPC refers to a macroblock type and coded block pattern for chrominance. As discussed, ACpred_flag 753 is a one bit flag which, when set to zero, indicates that only DC prediction is performed for a current INTRA block. ACpred_flag=1 indicates that AC and DC prediction are performed for a current INTRA block. CBPY refers to a coded block pattern for luminance. DQUANT defines changes in the value of a quantizer, Qp, from macroblock to macroblock.

The field Interlaced_information in the third row 750 indicates whether a macroblock is interlaced coded. The Interlaced_information field may be stored for subsequent use as required in the motion vector memory 1349 or other memory in the decoder. The Interlaced_information field may also include the flag dct_type which, as discussed, indicates whether top and bottom field pixel lines in a field coded macroblock are reordered.

MVD, MVD2, MVD3 and MVD4 refer to motion vector data. Alpha_ACpred_flag refers to an ACpred_flag for alpha shape coding. Alpha Block Data refers to binary and gray scale shape information known as alpha planes.

The arrangement shown in FIG. 7 is an example only. Various other arrangements for communicating the relevant information to the decoder will become apparent to those skilled in the art.

A bitstream syntax and MB packet syntax for use in accordance with the present invention is described in MPEG-4 VM 8.0 as well as commonly assigned U.S. patent application Ser. No. 08/897,847 to Eifrig et al., filed Jul. 21, 1997, entitled "Motion Estimation and Compensation of Video Object Planes for Interlaced Digital Video", incorporated herein by reference.

Accordingly, it can be seen that the present invention provides a scheme for efficiently coding DC and AC DCT transform coefficients of an INTRA coded block. The DC and AC coefficients are differentially encoded by selecting predictor DC and AC coefficients from a left-hand neighboring block and a top neighboring block. Each block is coded according to a frame mode, a reordered field mode, or a non-reordered field mode. The AC predictor block is selected according to the respective coding modes of the blocks, and the block in which the DC predictor resides. The top block is selected as an AC predictor when the top block and current block are both reordered field mode, or both frame mode and/or non-reordered field mode, and the DC predictor resides in the top block. Zeroed AC spatial transform coefficients are used in place of the AC spatial transform coefficients from the selected block when the selected block is not INTRA coded, or does not reside in the same Video Object Plane (VOP) as the current block. DC coefficients can similarly be set to a non-zero value in this case.

In particular, the present invention improves coding efficiency over previous schemes which do not provide the top block as a candidate predictor block, or account for whether the current and candidate blocks are coded in a frame mode, non-reordered field mode, or reordered field mode. Correlation of spatial frequencies between the current block and the top block can result in improved coding efficiency. Additionally, the scheme encompasses the MPEG-4 standard by providing for zeroing of predictor coefficients when the candidate predictor is outside a current video object plane (VOP), is not INTRA coded, or is otherwise not available.

Additionally, the scheme is compatible with both linear and non-linear quantization of the DCT coefficients. In particular, non-linear quantization of DC coefficients is disclosed, where the coded coefficient is scaled at a decoder according to the quantization levels of the macroblock in which the coefficient resides and of the macroblock in which the selected prediction block resides to recover the scaled coefficient.

Although the invention has been described in connection with various specific embodiments, those skilled in the art will appreciate that numerous adaptations and modifications may be made thereto without departing from the spirit and scope of the invention as set forth in the claims. For example, while the invention was discussed in connection with DCT transform coefficients, the invention may be adapted for use with coefficients of other spatial transforms.

What is claimed is:

1. A method for coding spatial transform coefficients of a current, INTRA coded block in a digital video image, comprising the steps of:

identifying an adjacent left-hand block, an adjacent top block, and a top, left block which is adjacent to said left-hand block and said top block;

said left-hand block, top block, and top, left block each having a DC spatial transform coefficient and a plurality of AC spatial transform coefficients;

each of said blocks being coded in a coding mode according to one of a frame mode, a reordered field mode, and a non-reordered field mode; and selecting AC spatial transform coefficients from one of said left-hand block and said top block for use in differentially encoding respective AC spatial transform coefficients of said current block;

said selecting step being responsive to the coding mode of said current block and said top block.

2. The method of claim 1, comprising the further step of:
   selecting the AC spatial transform coefficients from said left-hand block when said top block is coded according to one of the frame mode and the non-reordered field mode, and said current block is coded according to the reordered field mode.

3. The method of claim 1, comprising the further step of:
   selecting the AC spatial transform coefficients from said left-hand block when said current block is coded according to one of the frame mode and the non-reordered field mode, and said top block is coded according to the reordered field mode.

4. The method of claim 1, comprising the further step of:
   selecting a DC spatial transform coefficient for use in differentially encoding the DC spatial transform coefficient of said current block from one of said left-hand block and said top block according to (a) a gradient between the DC spatial transform coefficients of said left block and said top, left block, and (b) a gradient between the DC spatial transform coefficients of said top block and said top, left block.

5. The method of claim 4, comprising the further step of:
   selecting AC spatial transform coefficients for use in the differential encoding from one of said left-hand block and said top block according to the selected DC spatial transform coefficient.

6. The method of claim 4, comprising the further step of:
   selecting AC spatial transform coefficients for use in the differential encoding from said top block when the DC spatial transform coefficient is selected from said top block, and said current block is coded according to the frame mode or the non-reordered field mode, and said top block is coded according to the frame mode or the non-reordered field mode.

7. The method of claim 4, comprising the further step of:
   selecting AC spatial transform coefficients for use in the differential encoding from said top block when the DC spatial transform coefficient is selected from said top block, and said current block and said top block are both coded according to the reordered field mode.

8. The method of claim 1, comprising the further step of:
   using zeroed AC spatial transform coefficients in place of the AC spatial transform coefficients from the selected block when the selected block is not INTRA coded.

9. The method of claim 1, wherein said current block resides in a current video object plane (VOP), comprising the further step of:
   using zeroed AC spatial transform coefficients in place of the AC spatial transform coefficients from the selected block when the selected block does not reside in said current VOP.

10. The method of claim 4, comprising the further step of:
    non-linearly quantizing the DC spatial transform coefficient of the current block.

11. A method for decoding differentially encoded spatial transform coefficients of a current, INTRA coded block in a digital video image which is transmitted in a digital bitstream to recover corresponding full AC spatial transform coefficients of said current block, comprising the steps of:

recovering said digital bitstream;

said digital bitstream comprising data from an adjacent left-hand block, an adjacent top block, and a top, left block which is adjacent to said left-hand block and said top block;

said left-hand block, top block, and top, left block each having a DC spatial transform coefficient and a plurality of AC spatial transform coefficients;

each of said blocks being coded in a coding mode according to one of a frame mode, a reordered field mode, and a non-reordered field mode;

selecting AC spatial transform coefficients from one of said left-hand block and said top block; and summing said selected AC spatial transform coefficients with said corresponding differentially encoded AC spatial transform coefficients of said current block to recover said full AC spatial transform coefficients of said current block;

said selecting step being responsive to the coding mode of said current block and said top block.

12. The method of claim 11, comprising the further step of:

selecting AC spatial transform coefficients for said summing step from said left-hand block when said top block is coded according to one of the frame mode and the non-reordered field mode, and said current block is coded according to the reordered field mode.

13. The method of claim 11, comprising the further step of:

selecting AC spatial transform coefficients for said summing step from said left-hand block when said current block is coded according to one of the frame mode and the non-reordered field mode, and said top block is coded according to the reordered field mode.

14. The method of claim 11, wherein the DC spatial transform coefficient of said current block is differentially encoded prior to transmission in the digital bitstream using the DC spatial transform coefficient from one of said left-hand block and said top block according to (a) a first gradient between the DC spatial transform coefficients of said left block and said top, left block, and (b) a second gradient between the DC spatial transform coefficients of said top block and said top, left block, comprising the further steps of:

determining said first and second gradients; and selecting the DC spatial transform coefficient which was used in differentially encoding the DC spatial transform coefficient of said current block from one of said left-hand block and said top block according to the determined gradients.

15. The method of claim 14, comprising the further step of:

selecting AC spatial transform coefficients for said summing step from one of said left-hand block and said top block according to the selected DC spatial transform coefficient.

16. The method of claim 14, comprising the further step of:

selecting AC spatial transform coefficients for said summing step from said top block when the DC spatial transform coefficient is selected from said top block, and said current block is coded according to the frame mode or the non-reordered field mode, and said top block is coded according to the frame mode or the non-reordered field mode.

17. The method of claim 14, comprising the further step of:

selecting AC spatial transform coefficients for said summing step from said top block when the DC spatial transform coefficient is selected from said top block, and said current block and said top block are both coded according to the reordered field mode.

18. The method of claim 11, comprising the further step of:

using zeroed AC spatial transform coefficients in place of the AC spatial transform coefficients from the selected block when the selected block is not INTRA coded.

19. The method of claim 11, wherein said current block resides in a current video object plane (VOP), comprising the further step of:

using zeroed AC spatial transform coefficients in place of the AC spatial transform coefficients from the selected block when the selected block does not reside in said current VOP.

20. The method of claim 11, wherein:

said selecting step is responsive to a codeword provided in said digital bitstream which designates the AC spatial transform coefficients from one of said left-hand block and said top block.

21. The method of claim 14, wherein the DC spatial transform coefficient of the current block is non-linearly quantized, comprising the further steps of:

recovering data from said digital bitstream indicative of the respective quantization levels of the selected block and the current block; and scaling the DC spatial transform coefficient of the current block according to the respective quantization levels of the selected block and the current block to recover a scaled DC spatial transform coefficient.

22. An apparatus for coding spatial transform coefficients of a current, INTRA coded block in a digital video image, comprising:

means for identifying an adjacent left-hand block, an adjacent top block, and a top, left block which is adjacent to said left-hand block and said top block;

said left-hand block, top block, and top, left block each having a DC spatial transform coefficient and a plurality of AC spatial transform coefficients;

each of said blocks being coded in a coding mode according to one of a frame mode, a reordered field mode, and a non-reordered field mode; and means for selecting AC spatial transform coefficients from one of said left-hand block and said top block for use in differentially encoding respective AC spatial transform coefficients of said current block;

said means for selecting being responsive to the coding mode of said current block and said top block.

23. The apparatus of claim 22, wherein:

said means for selecting selects the AC spatial transform coefficients from said left-hand block when said top block is coded according to one of the frame mode and the non-reordered field mode, and said current block is coded according to the reordered field mode.

24. The apparatus of claim 22, wherein:

said means for selecting selects the AC spatial transform coefficients from said left-hand block when said current block is coded according to one of the frame mode and the non-reordered field mode, and said top block is coded according to the reordered field mode.

25. The apparatus of claim 22, wherein:

said means for selecting selects a DC spatial transform coefficient for use in differentially encoding the DC spatial transform coefficient of said current block from one of said left-hand block and said top block according to (a) a gradient between the DC spatial transform coefficients of said left block and said top, left block, and (b) a gradient between the DC spatial transform coefficients of said top block and said top, left block.

26. The apparatus of claim 25, wherein:

said means for selecting selects AC spatial transform coefficients for use in the differential encoding from one of said left-hand block and said top block according to the selected DC spatial transform coefficient.

27. The apparatus of claim 25, wherein:

said means for selecting selects AC spatial transform coefficients for use in the differential encoding from said top block when the DC spatial transform coefficient is selected from said top block, and said current block is coded according to the frame mode or the non-reordered field mode, and said top block is coded according to the frame mode or the non-reordered field mode.

28. The apparatus of claim 25, wherein:

said means for selecting selects AC spatial transform coefficients for use in the differential encoding from said top block when the DC spatial transform coefficient is selected from said top block, and said current block and said top block are both coded according to the reordered field mode.

29. The apparatus of claim 22, further comprising:

means for using zeroed AC spatial transform coefficients in place of the AC spatial transform coefficients from the selected block when the selected block is not INTRA coded.

30. The apparatus of claim 22, wherein said current block resides in a current video object plane (VOP), further comprising:

means for using zeroed AC spatial transform coefficients in place of the AC spatial transform coefficients from the selected block when the selected block does not reside in said current VOP.

31. The apparatus of claim 25, further comprising:

means for non-linearly quantizing the DC spatial transform coefficient of the current block.

32. An apparatus for decoding differentially encoded spatial transform coefficients of a current, INTRA coded block in a digital video image which is transmitted in a digital bitstream to recover corresponding full AC spatial transform coefficients of said current block, comprising:

means for recovering said digital bitstream;

said digital bitstream comprising data from an adjacent left-hand block, an adjacent top block, and a top, left block which is adjacent to said left-hand block and said top block;

said left-hand block, top block, and top, left block each having a DC spatial transform coefficient and a plurality of AC spatial transform coefficients;

each of said blocks being coded in a coding mode according to one of a frame mode, a reordered field mode, and a non-reordered field mode;

first means for selecting AC spatial transform coefficients from one of said left-hand block and said top block; and means for summing said selected AC spatial transform coefficients with said corresponding differentially encoded AC spatial transform coefficients of said current block to recover said full AC spatial transform coefficients of said current block;

said first means for selecting being responsive to the coding mode of said current block and said top block.

33. The apparatus of claim 32, wherein:

said first means for selecting selects AC spatial transform coefficients for use by the summing means from said left-hand block when said top block is coded according to one of the frame mode and the non-reordered field mode, and said current block is coded according to the reordered field mode.

34. The apparatus of claim 32, wherein:

said first means for selecting selects AC spatial transform coefficients for use by the summing means from said left-hand block when said current block is coded according to one of the frame mode and the non-reordered field mode, and said top block is coded according to the reordered field mode.

35. The apparatus of claim 32, wherein the DC spatial transform coefficient of said current block is differentially encoded prior to transmission in the digital bitstream using the DC spatial transform coefficient from one of said left-hand block and said top block according to (a) a first gradient between the DC spatial transform coefficients of said left block and said top, left block, and (b) a second gradient between the DC spatial transform coefficients of said top block and said top, left block, further comprising:

means for determining said first and second gradients; and second means for selecting the DC spatial transform coefficient which was used in differentially encoding the DC spatial transform coefficient of said current block from one of said left-hand block and said top block according to the determined gradients.

36. The apparatus of claim 35, wherein:

said first means for selecting selects AC spatial transform coefficients for use by the summing means from one of said left-hand block and said top block according to the selected DC spatial transform coefficient.

37. The apparatus of claim 35, wherein:

said first means for selecting selects AC spatial transform coefficients for use by the summing means from said top block when the DC spatial transform coefficient is selected from said top block, and said current block is coded according to the frame mode or the non-reordered field mode, and said top block is coded according to the frame mode or the non-reordered field mode.

38. The apparatus of claim 35, wherein:

said first means for selecting selects AC spatial transform coefficients for use by the summing means from said top block when the DC spatial transform coefficient is selected from said top block, and said current block and said top block are both coded according to the reordered field mode.

39. The apparatus of claim 32, further comprising:

means for using zeroed AC spatial transform coefficients in place of the AC spatial transform coefficients from the selected block when the selected block is not INTRA coded.

40. The apparatus of claim 32, wherein said current block resides in a current video object plane (VOP), further comprising:

means for using zeroed AC spatial transform coefficients in place of the AC spatial transform coefficients from the selected block when the selected block does not reside in said current VOP.

41. The apparatus of claim 32, wherein:

said first means for selecting is responsive to a codeword provided in said digital bitstream which designates the AC spatial transform coefficients from one of said left-hand block and said top block.

42. The apparatus of claim 35, wherein the DC spatial transform coefficient of the current block is non-linearly quantized, further comprising:

means for recovering data from said digital bitstream indicative of the respective quantization levels of the selected block and the current block; and means for scaling the DC spatial transform coefficient of the current block according to the respective quantization levels of the selected block and the current block to recover a scaled DC spatial transform coefficient.

* * * * *